United States Patent
Smolyar et al.

(10) Patent No.: US 7,277,496 B2
(45) Date of Patent: Oct. 2, 2007

(54) DEVICE, SYSTEM AND METHOD FOR BLIND FORMAT DETECTION

(75) Inventors: Lev Smolyar, Givat Shmuel (IL); Itshak Bergel, Givat Shmuel (IL)

(73) Assignee: Intel Corporation, Santa Clara ( * ) Notice: Subject to any disclaimer, the term of this patent is extended or adjusted under 35 U.S.C. 154(b) by 403 days.

(21) Appl. No.: 10/608,448

(22) Filed: Jun. 30, 2003

(65) Prior Publication Data

US 2005/0187995 A1    Aug. 25, 2005

(51) Int. Cl.
 H04L 27/00    (2006.01)
(52) U.S. Cl. .................... 375/295; 375/341; 714/712; 455/437
(58) Field of Classification Search ................ 375/295, 375/341; 714/712; 455/437
See application file for complete search history.

(56) References Cited

U.S. PATENT DOCUMENTS

| | | | | |
|---|---|---|---|---|
| 5,936,972 | A * | 8/1999 | Meidan et al. | 714/712 |
| 6,161,013 | A * | 12/2000 | Anderson et al. | 455/437 |
| 2004/0091067 | A1 * | 5/2004 | Ammer et al. | 375/341 |
| 2006/0146963 | A1 * | 7/2006 | Valadon | 375/341 |
| 2006/0176976 | A1 * | 8/2006 | Pedersen et al. | 375/295 |

FOREIGN PATENT DOCUMENTS

| | | | |
|---|---|---|---|
| EP | 1187343 A2 | * | 3/2002 |
| EP | 1387516 A1 | * | 7/2002 |
| GB | 2366167 A | * | 2/2002 |
| WO | WO 02/060083 A2 | * | 8/2002 |

OTHER PUBLICATIONS

Blind rate detection algorithm in W-CDMA mobile receiver; Insoo Sohn; Seoyoung Lee; Vehicular Technology Conference, 2001. VTC 2001 Fall. IEEE VTS 54$^{th}$ ; vol. 3, Oct. 7-11, 2001 pp. 1589-1592.*

Block-size estimation and application to BTFD for 3GPP UMTS; Ahmed, W.K.M.; Global Telecommunications Conference, 2001. GLOBECOM '01. IEEE; vol. 5, Nov. 25-29, 2001 pp. 3045-3049.*

Viterbi Algorithm, http://www.scs.leeds.ac.uk/scs-only/teaching-materials/HiddenMarkovModels/html_dev/viterbi_algorithm/s4_pg1.html Printed Jun. 3, 2003.

3GPP TS 25.212 V3.9.0, 3rd Generation Partnership Project (3GPP standard); Technical Specification Group Radio Access Network; Multiplexing and channel coding (FDD). Mar. 2002, pp. 56-57.

* cited by examiner

*Primary Examiner*—Chieh M. Fan
*Assistant Examiner*—Sudhanshu C. Pathak
(74) *Attorney, Agent, or Firm*—Pearl Cohen Zedek Latzer, LLP

(57) ABSTRACT

Device, systems, and methods to detect unknown transmission formats are provided. Viterbi metric values may be calculated for a plurality of possible format parameters for a transmission format. Format metric values may be calculated for a plurality of the calculated Viterbi metric values, and the calculated format metric values may be compared. Based on the comparison, a probable transmitted format from a set of possible formats may be determined.

22 Claims, 5 Drawing Sheets

DEVICE, SYSTEM AND METHOD FOR BLIND FORMAT DETECTION

BACKGROUND OF THE INVENTION

Code Division Multiple Access (CDMA) provides a method for transmitting simultaneous signals over a shared portion of the transmission spectrum. CDMA's spread spectrum technique generally overlaps transmissions on the same carrier frequency, by assigning a unique code to different conversations. After a speech codec (for example, a hardware circuit or software routine) converts voice signals to digital signals, CDMA generally spreads the voice stream over the full bandwidth of the CDMA channel, and separately codes the various data blocks making up the stream so that they may be decoded at the receiving end. In this way, different voice conversations may use the full bandwidth of a data channel at the same time. Wideband-CDMA, hereinafter referred to as "WCDMA" is a Third Generation (3G) technology that increases data transmission rates in GSM systems by using the CDMA air interface instead of Time Division Multiple Access (TDMA).

One sequence for a data block transfer using the WCDMA standard may include, for example, encoding/decoding a data block or stream from/to MAC and higher layers, to offer transport services over the radio transmission link. The channel-coding scheme may generally be a combination of error detection, error correcting, rate matching, interleaving and transport channels mapping onto and/or splitting from physical channels, thereby providing various data block format types.

To avoid transmitting too much information, however, the WCDMA standard in some cases does not provide the receiving units, such as, for example, mobile handsets, with precise information regarding the transmitted data block format. In such a case a mobile handset, for example, may have to determine which format, out of a predetermined set of possible formats, was transmitted, to decode the received data. The user equipment (for example a handset) generally chooses between possible formats that include the same coding scheme and Cyclical Redundancy Checking, hereinafter referred to as "CRC". These formats may generally be differentiated by the size of the transport blocks and/or the number of transport blocks transmitted.

According to the CDMA standard, data transfer may be transmitted in blocks of various formats, generally related to the amount of data being transmitted. For example, voice signals may differ according to the speech intensity that generated the signal. Discontinuous Transmission bits, hereinafter referred to as "DTX", which may be added to a data block to generate a standard size block (for example, by adding zero signals to equalize transmission sizes), may be used. Transport Format Combination Indicator bits, hereinafter referred to as "TFCI" are generally used to indicate voice signal format types. However, TFCI bits may not be sent in all cases, in which case it may not be known which format was sent, and may, for example, present a problem for decoding the data block.

BRIEF DESCRIPTION OF THE DRAWINGS

Embodiments of the present invention may be better understood and appreciated from the following detailed description taken in conjunction with the appended drawings, it being understood that these drawings are given for illustrative purposes only and are not meant to be limiting, wherein.

Figure 1:
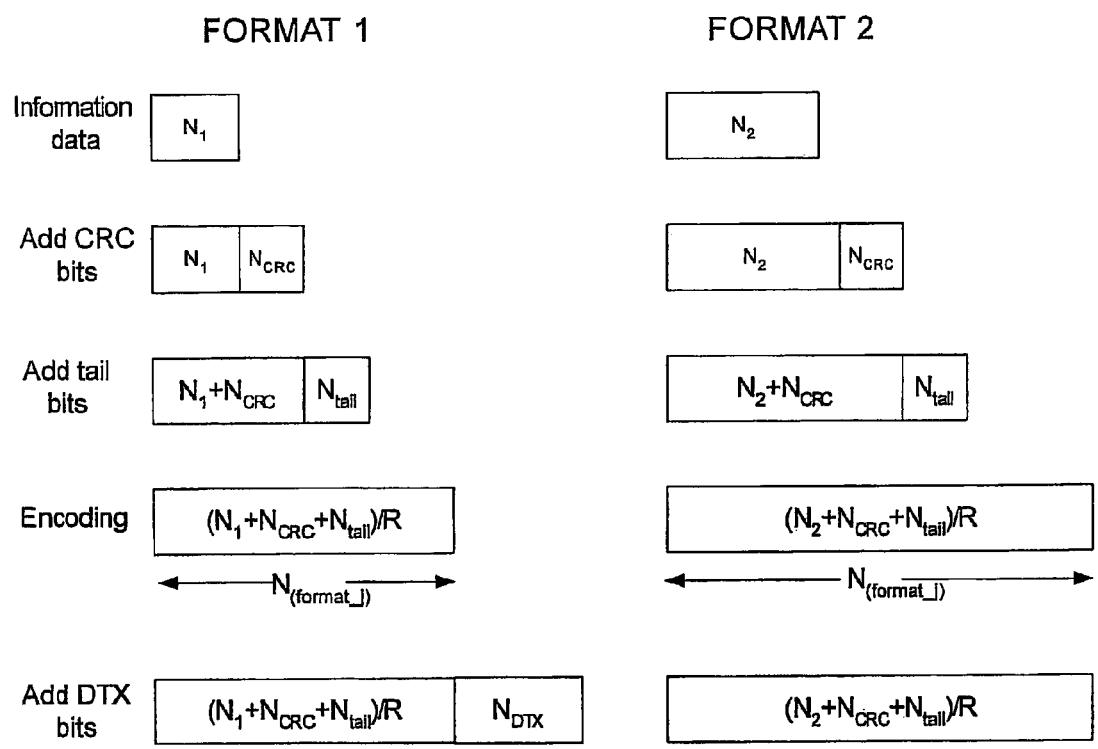
FIG. 1 is a schematic illustration of examples of two format types, according to some embodiments of the present invention.

It will be appreciated that for simplicity and clarity of illustration, elements shown in the figures have not necessarily been drawn to scale. For example, the dimensions of some of the elements may be exaggerated relative to other elements for clarity. Additionally, like reference numerals may indicate corresponding, analogous or similar elements.

DETAILED DESCRIPTION OF EMBODIMENTS OF THE INVENTION

In the following detailed description, numerous specific details are set forth in order to provide a thorough understanding of embodiments of the invention. However it will be understood by those of ordinary skill in the art that the embodiments of the invention may be practiced without these specific details. In other instances, well-known methods, procedures, components and circuits have not been described in detail so as not to obscure the description of embodiments of the invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts, functions or operations leading to a desired result. These may include physical manipulations of physical quantities. Usually, though not necessarily, these quantities may take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "defining," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. These apparatuses may be specially constructed for the desired purposes, or they may comprise a general-purpose computing device selectively activated or reconfigured by a program stored in the device. Such a program may be stored on a storage medium, such as, but is not limited to, any type of disk including floppy disks, optical disks, CD-ROMs, magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

Reference is now made to FIG. 1, which illustrates processes for data transfer using WCMDA technology, according to some embodiments of the present invention. Format 1 and Format 2 illustrate two examples of how a data block may be transferred using the WCMDA standard. As can be seen in FIG. 1, a data block with N data bits ($N_1$ or $N_2$ in the figure) may be transmitted by, for example, a base station. A quantity of N Cyclical Redundancy Checking (CRC) bits ($N_{CRC}$) may be added to the data bits (for example $N_1$ for format 1) for enabling error correction. N tail bits ($N_{tail}$) may be added to the data blocks for decoding purposes. When encoding the data block, the bits in the data block, which in the current example are $N+N_{CRC}+N_{tail}$, may be divided by the encoding rate (R), to provide a decoding mechanism with information about the encoding procedure. The expression "$(N+N_{CRC}+N_{tail})/R$" may hereinafter refer to the number of transmitted data bits for a format, and may be indicated by the expression "$N_{(format\_j)}$". The value of this expression may be one value out of a known set of possible values. Discontinuous Transmission (DTX) bits ($N_{DTX}$) may be added to the data block. Other data block configurations may be used.

Formats of data blocks, which may refer, for example, to the number of data bits in a data block, such as, for example, format 1 and format 2, may differ, for example, in the number of data bits in a block, the number of DTX bits added to a block format (format 1) in order to have the same transmission time as the longer format (format 2). In a DTX field the transmitter may not transmit data, for example, by transmitting 0 in place of −1 or 1. In the current example, assuming an encoding rate (R) of ⅓m, for example, a function describing the relationship between the two formats described in FIG. 1 may be:

3*(*N*1+*N*CRC+*N*tail)+*N*DTX=3*(*N*2+*N*CRC+*N*tail).

Other encoding rates and functions may be used.

According to the WCDMA standard, in some cases a data transmission source, such as, for example, a base station, may not inform the mobile handset or other receiving device about the precise format of the transmitted data block, in which cases the mobile device, in order to decode the data block, may need to determine which format out of a predetermined set of possible formats have actually been sent. The base station may, for example, transmit data that may include a set of possible formats to the data-receiving device. The set of possible format parameters may be transmitted, for example, in a block header or transmitted in another suitable form. Determination of the format type in such cases may require, for example, blind format detection. An example of a known blind format detection method is that described in the "3GPP TS 25.212 V3.9.0", published 2002-03, pages 56-57, titled, "3rd Generation Partnership Project (3GPP standard); Technical Specification Group Radio Access Network; Multiplexing and channel coding (FDD) (Release 1999)", Blind transport format detection may use CRC for blind format detection. For example, a data-receiving device may perform Viterbi-decoding on a soft decision sample sequence, such that an assumed correct trellis path of the Viterbi-decoder ends at a zero state at the correct end bit position. Other formats or processes may be used.

According to some embodiments of the present invention, a method is provided for determining the type of format of transmitted data. An example of such a method may utilize maximum likelihood rate detection, wherein the log likelihood probability of a particular format having been transmitted is proportional to a calculated format metric for that particular format. The format metric, which may provide an indication of the most likely format transmitted, may use a Viterbi metric value, for example, which may be calculated for a plurality (two or more) of possible formats, or each of a set of possible formats, for example, by using a Trellis metric or any other suitable function. The Trellis metric may use a Trellis algorithm, Viterbi algorithm or other suitable functions. Trellis metrics, Trellis algorithm, Viterbi metrics and Viterbi algorithms are known in the art.

For example, a plurality of Viterbi metric values may be calculated for a plurality potential block formats, or a Viterbi metric may be calculated for each of a set of possible block formats, for example, by using a set of assumed data bit lengths. The assumed number of data bit lengths that may be used for potential "format_j", for example, may be, for example, represented by $N_{(format\_j)}$, where $N_{(format\_j)}$ is the actual number of transmitted bits (which is unknown) corresponding to format_j. A Viterbi metric used may be a function of a possible value for $N_{(format\_j)}$ and may be calculated, for example, using a function such as:

$$ViterbiMetric_{(format\_j)} = -\sum_{i=1}^{N(format\_j)} r_i \cdot \hat{d}_i.$$

In the above example, $r_i$ refers to samples of the received bits, where $-8 < r_i < 8$. $r_i$ may include all bits received, including data bits and DTX bits. Each $\hat{d}_i$ value may refer to a respective possible transmitted bit and may have a value of −1 or 1. These $\hat{d}_i$ values may be derived from the $r_i$ values by using, for example, a Trellis metric. A Trellis metric may, for example, be calculated by Trellis algorithm or a Viterbi algorithm or any other suitable function for determining the most probable sequence of hidden states given a sequence of observed states. The resulting set of $\hat{d}_i$ values may express the transmitted data, however it may be unclear which of these $\hat{d}_i$ values represent the actual format of the transmitted block. The Viterbi/Trellis algorithm may calculate a Viterbi metric value for each of the possible format values ($N_{(format\_j)}$) For example, the format values may include the set of 100, 200 and 300. Other functions may be used to determine the Viterbi metric values.

The calculated Viterbi metric values for each of a plurality of possible format parameters for transmitted data bits, $N_{(format\_j)}$, may be used to determine format metrics for one or more of the possible format values, which may be calculated according to, for example, a function such as:

$$FormatMetric_{(format\_j)} = \frac{ViterbiMetric^2_{(format\_j)}}{2\sigma^2 N_{(format\_j)}} - N_{(format\_j)} \ln(2) / CodingRate$$

Other suitable functions may be used. In the above function, for example, $N_{(format\_j)}$, which is the number of bits transmitted without for example, the DTX bits, is one of a set of possible $N_{(format\_j)}$ values for the possible respective formats, that can be transmitted by the data transmission source. ViterbiMetric$^2$ may, for example, refer to the square of the Viterbi metric value calculated above for the particular assumed format. Sigma ($\sigma$) may represent the noise standard deviation of the received data symbols, as may be calculated by known algorithms for determining noise standard deviation from received signals. Sigma$^2$ ($\sigma^2$) may represent the noise variance of the received data symbols, and may be calculated by known algorithms for determining noise variance from received signals. CodingRate may represent the encoding rate (R) used by the data transmitter source to encode the data block for transmission.

For example, when a base station transmits a data block to a receiving device such as, for example, a handheld communications device using WCDMA technology, the base station may define a plurality of possible $N_{(format\_j)}$ values for a data block transmitted, and send this information with the data block to the receiving communications device. Upon receipt of a data block the handheld device may identify the set of possible formats transmitted for a data block received, as communicated by, for example, the base station. For example the set of possible values, for example, 100, 200 or 300 bits, may be transmitted by a cellular base station. A receiving handset may check the block lengths, such as, for example, 100, 200 or 300 bits, to decode the transmitted block. An embodiment of the present invention may calculate a Viterbi metric for a plurality of possible block lengths, and may use these Viterbi metric values to calculate format metric values, which may indicate a probable transmitted format for the possible $N_{(format\_j)}$ values.

The Viterbi metric may be defined as the accumulated Viterbi metric assuming that the specific format was used, such as, for example, $N_{(format\_j)}$ bits, where $N_{(format\_j)}$ may be a number of data bits in a block, for example, 100, 200 or 300 etc. For example, the Viterbi metric value for the possible block format with 100 bits, for example, may be appropriately placed in the above equation to compute the format metric. The Viterbi metric value for the possible block format with 200 bits, for example, may be appropriately placed in the above equation to compute a format metric. The Viterbi metric value for the possible block format with 300 bits, for example, may be appropriately placed in the above equation to compute the format metric. The highest metric from the above calculations, for example, may be assumed to correspond to a probable or most probable transmitted format. This format information may be used for decoding of the transmitted data block. In alternate embodiments other measures may be used to choose a suitable calculation result, and thus a probable format.

Figure 2:
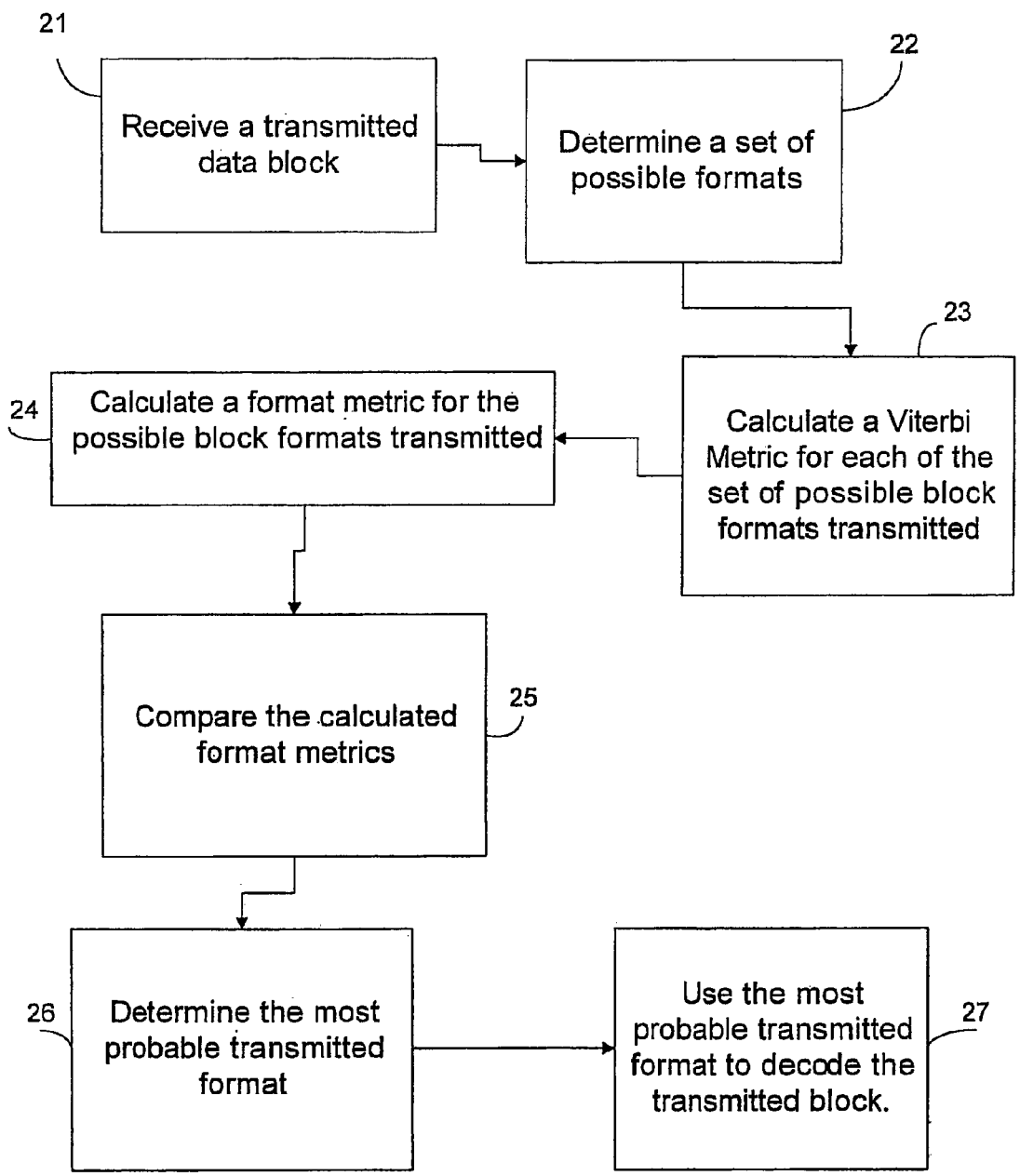
FIG. 2 is a flow chart illustrating a process of format detection, according to some embodiments of the present invention.

FIG. 2 is a flow chart depicting a series of blocks representing a format detection process, according to an embodiment of the present invention. Referring to FIG. 2, in block 21, the process receives a transmitted data block at a receiving device such as, for example, a mobile handset. In block 22 the process identifies or determines a set of possible format parameters for a transmitted data block, such as, for example, a set of possible numbers of transmitted bits without the DTX bits, for a received block. These possible data bit numbers for format "j", for example, may be represented by $N_{(format\_j)}$.

In block 23 the process calculates a plurality of Viterbi metrics for a plurality of possible block formats, or a Viterbi metric for each of a set of possible block formats, using, for example, one or more of the set of possible data bits represented by $N_{(format\_j)}$, according, for example, to a Trellis metric. The Trellis metric may, for example, incorporate a Trellis algorithm, a Viterbi algorithm, or other suitable functions. The Viterbi metric calculation may use, for example, a function such as:

$$ViterbiMetric_{(format\_j)} = - \sum_{i=1}^{N(format\_j)} r_i \cdot \hat{d}_i.$$

For example, a plurality of Viterbi Metric values may be calculated for a plurality of possible block formats, using, for example, one or more of the set of possible data bits represented by $N_{(format\_j)}$, as determined in block 22.

In block 24 the process calculates a plurality of format metric values for one or more values of a set of possible format parameters, for example the number of transmitted data bits, as determined in block 22. These format metrics may be calculated for the Viterbi metric values calculated in block 23. For example, this calculation may be implemented by placing the Viterbi metric result for a possible format parameter into a format metric function for the respective possible format parameters, such as, for example, the number of transmitted data bits. For example, the format metric function may be, for example:

$$FormatMetric_{(format\_j)} = \frac{ViterbiMetric^2_{(format\_j)}}{2\sigma^2 N_{(format\_j)}} - N_{(format\_j)} \ln(2) / CodingRate$$

where the possible transmitted data bits are represented by $N_{(format\_j)}$, and other parameters are as described above.

In block 25, the process compares the calculated format metrics, for example, as calculated in block 24.

In block 26, the process determines the most probable transmitted format. Typically, this format corresponds to the largest format metric, for example, as calculated in block 24, but may correspond to another metric size.

In block 27, the process uses the most probable transmitted format, as determined, for example, in block 26, to decode the transmitted block.

Other functions, operations, or combinations of operations may be implemented. Alternative embodiments may introduce into the calculations factors based, for example, on the amplitude value, the noise standard deviation, the difference between the number of bits for the respective formats or on other factors.

Figure 3A:
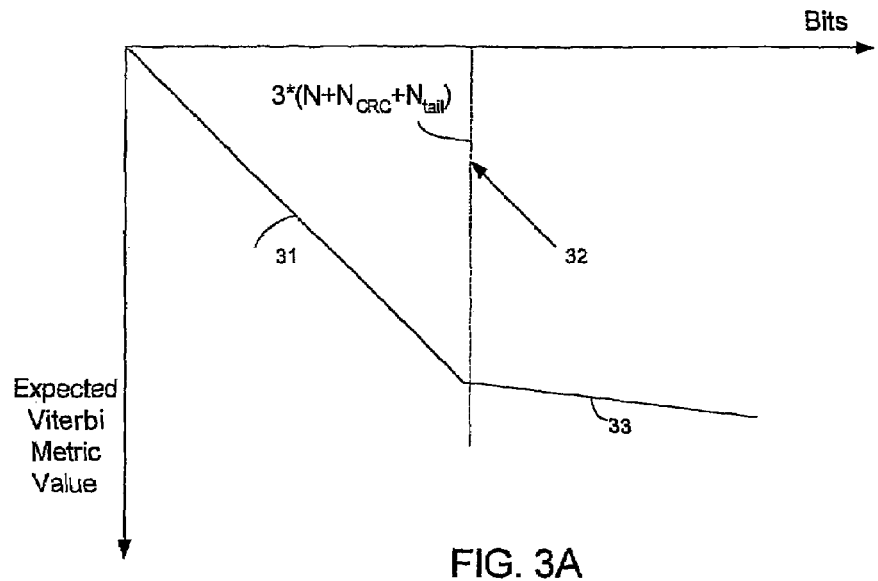
FIGS. 3A and 3B are charts illustrating examples of the expected Viterbi metric values relative to the number of transmitted bits, according to some embodiments of the present invention.

As can be seen with reference to FIG. 3A, the expectation of the Viterbi metric may increase linearly, on average, at a rate that depends on, for example, the signal amplitude for data bits. For example, the calculated Viterbi metric value may be proportional to the received signal amplitude multiplied by the assumed number of transmitted bits for a plurality of possible formats. For example, the number of bits in the transmitted format may be represented by $N_{(format\_j)}$ for format_j.

In the case where the number of bits used for a Viterbi metric calculation is smaller than the number of bits in the correct or actual data block format, represented by line 32, which corresponds to $3*(N+N_{CRC}+N_{tail})$, the expected Viterbi metric value may increase linearly at a certain rate, as can be seen by line 31. Conversely, when the number of bits used for a Viterbi metric calculation is larger than the number of bits in the actual data block format, the expected Viterbi metric value may increase linearly, although at a slower rate, as can be seen by line 33 in FIG. 3A. Line 33 may have a slower rate of increase than line 31, as the DTX bits, which may have no signal (for example, they may provide noise only), may be transmitted after the actual number of data bits in the data block has been transmitted. For example, if in a first format 100 bits are actually being transmitted, along with 12 CRC bits and 8 tail bits, and with an encoding rate of ⅓, the data block may be defined by a function such as, for example, $3*(N_1+12+8)$. If the assumed data bits transmitted ($N_{(format\_j)}$) is 50, the graph may show a linear relationship between the expected Viterbi metric value and the number of bits transmitted, represented by line 31. If the assumed data bits transmitted ($N_{(format\_j)}$) is 200, the graph may determine a different linear relationship between the expected Viterbi metric value and the number of bits transmitted, represented by line 33.

Figure 3B:
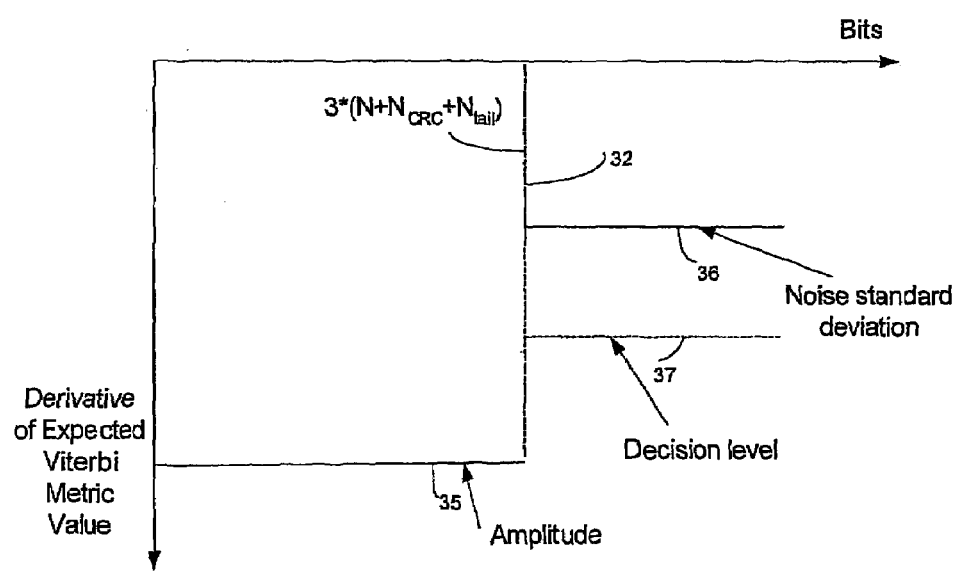

As can be seen with reference to FIG. 3B, which illustrates an example of a set of derivatives of the Viterbi metrics described in FIG. 3A, the Viterbi metrics represented in FIG. 3B may be determined at least in part by the noise standard deviation and/or the amplitude of the received block's signal. As can be seen in FIG. 3B, the average bit amplitude for a set of possible transmitted data bits is proportional to the amplitude of received bits multiplied by the bit number. The signal amplitude may represent the average addition to the Viterbi metric value from additional bits transmitted. The derivative of the Viterbi metric value may be indicated by line 35, for possible $N_{(format\_j)}$ values below the actual $N_{(format\_j)}$ value ($N+N_{CRC}+N_{tail}$), as indicated by line 32, which represents the actual number of transmitted bits. If the possible number of bits transmitted is more than the actual number of bits transmitted ($N+N_{CRC}+N_{tail}$), the derivative of the Viterbi metric value is closer to zero than the value represented by line 35, but still proportional to the number of possible bits transmitted, as indicated by line 36. Line 36, for example, may represent the effects of noise standard deviation, which may generate a closer to zero derivative of the Viterbi metric value than line 35, due to, for example, the addition of DTX bits into the Viterbi metric.

According to some embodiments of the present invention, a decision level may be used to define one or more limits beyond which the most probable format may be defined. The decision level may be a value, such as a number, determined by a user or processor, used to define, for example, the status of a format. In one embodiment, a decision level related to amplitude of bits transmitted may be determined to be at some point between the amplitude squared and the standard deviation. For example, the decision level may be determined according to the average value of the noise standard deviation and the signal amplitude. Other suitable functions or methods may be used to determine the decision level. As can be seen in FIG. 3B, the decision level may be selected at a point between the amplitude (such as, for example, line 35), and the noise standard deviation, for example, line 36, for example, in the location represented by line 37. The selected decision level variable may be used in a format metric function to compare amplitudes of various possible data transmission formats.

For example, if an assumed data bit number N, generates a greater per bit amplitude than the decision level value, it may be assumed that the assumed number of transmitted bits ($N_1$) is less than the actual number of transmitted bits [$3*(N+N_{CRC}+N_{tail})$], thereby approximating the amplitude per bit (line 35). Correspondingly, if an assumed data bit number $N_2$ generates a lesser per symbol power than the decision level, it may be assumed that the assumed number of transmitted bits $N_2$ is greater than the actual number of transmitted bits [$3*(N+N_{CRC}+N_{tail})$], thereby approximating the noise standard deviation per bit (line 36). A decision regarding the actual format used for transmitting a data block may therefore be based on format metrics that are calculated for a plurality of possible formats of the data block transmitted, based on the Viterbi output for a set of possible formats transmitted. The format metrics may be calculated by a function such as, for example:

$$FormatMetric_{(format\_j)} = DecisionLevel * N_{(format\_j)} - ViterbiMetric_{(format\_j)}$$

Other suitable functions may be used. DecisionLevel may, for example, be calculated based on the amplitude value, the noise standard deviation, the difference between the number of bits for the respective formats etc. In one embodiment, DecisionLevel is the average of the noise standard deviation and the signal amplitude. Other suitable functions or methods may be used to determine the decision level. The Decision level may be represented as a line, such as line 37 in FIG. 3B, relating to the derivative of the expected Viterbi metric value. $N_{(format\_j)}$ may be, for example, one of a set of possible format values for format_j. ViterbiMetric may be, for example, a value as calculated above, according to a Trellis metric, Viterbi algorithm, or other suitable function.

The decision as to which format is the actual one transmitted may be made, for example, according to which data block generated the lowest metric, according to the above function. In alternate embodiments other measures may be used to choose the most suitable calculation result, and thus the most probable format.

The decision level may, for example, be calculated based on the amplitude value, the noise standard deviation, and/or the difference between the numbers of bits for the respective formats etc. Other suitable factors may be used, and any suitable combination of factors may be used. According to an embodiment of the present invention, decision level determination may include, for example, calculating the decision level based on amplitude only, while the noise standard deviation is assumed to be less than k*Amplitude, and k is a constant determined by the systems worst case signal to noise ratio (SNR). For example:

$$SNR = Amplitude^2/noise\ variance$$

Therefore: noise variance=Amplitude$^2$/SNR

In this way, noise variance (and noise standard deviation) may be calculated from amplitude and worst case signal to noise ratios. According to some embodiments of the present invention a decision level may be determined based on amplitude without noise standard deviation. Other suitable functions may be used.

Figure 4:
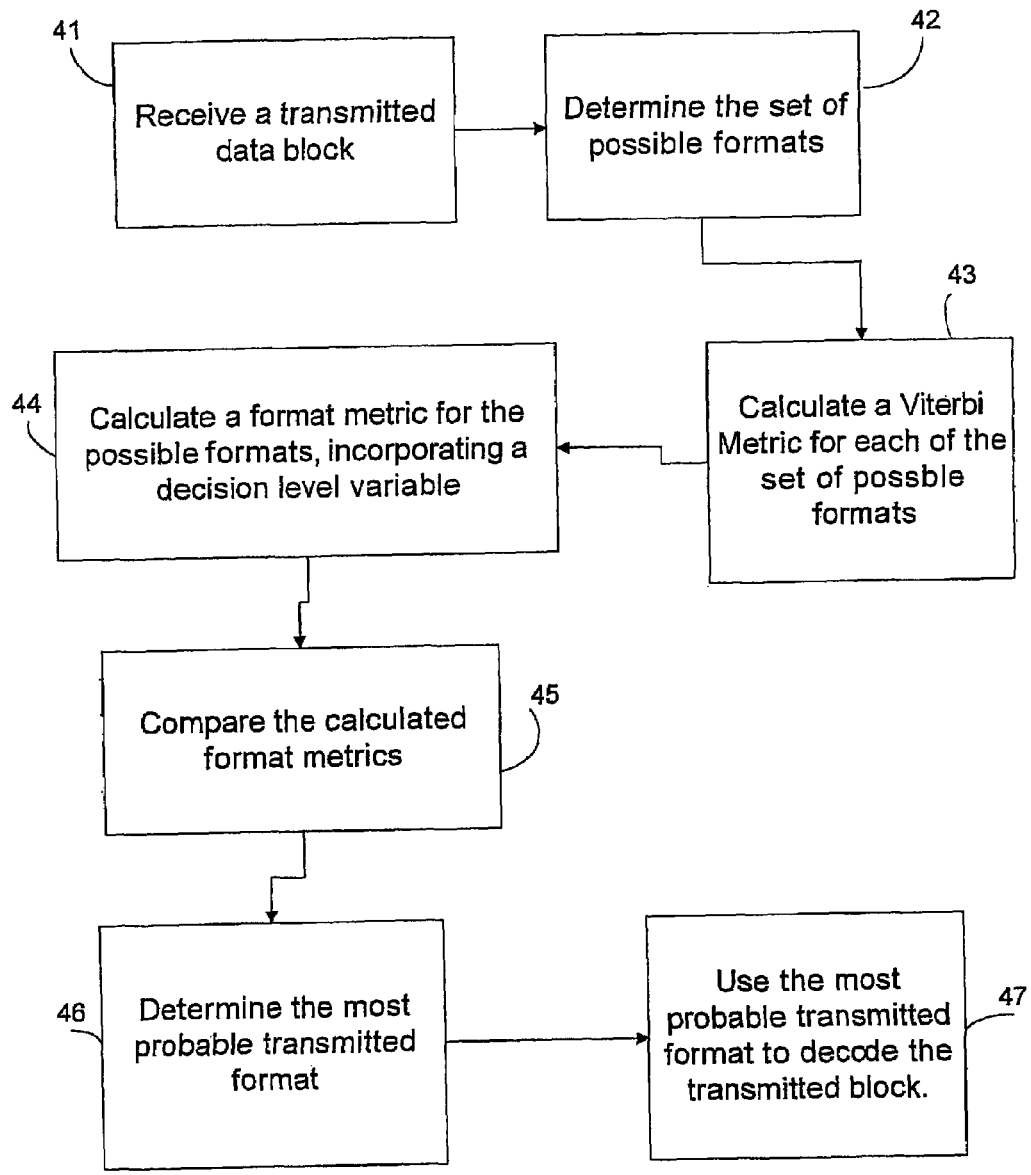
FIG. 4 is a flow chart illustrating a process of format detection, according to some embodiments of the present invention.

FIG. 4 is a block diagram representing an exemplary format detection process, based on the behavior of the Viterbi metric as a function of the number of bits transmitted, according to one embodiment of the present invention. Referring to FIG. 4, in block 41 the process receives a transmitted block at a receiving device such as, for example, a mobile handset.

In block 42 the process determines a set of possible format parameters for a transmitted data block, which may represent, for example, a set of possible numbers of transmitted bits without the DTX bits. These possible data bit numbers for format_j, for example, may be represented by, for example, $N_{(format\_j)}$.

In block 43 the process calculates a plurality of Viterbi metric values for a plurality of possible block formats, or a Viterbi metric for each of a set of possible block formats, using, for example, a set of possible data bits represented by $N_{(format\_j)}$, according to, for example, a Trellis metric. The Trellis metric may, for example, incorporate a Trellis algorithm, a Viterbi algorithm, or another suitable functions. The Viterbi metric calculation may use, for example, a function such as:

$$ViterbiMetric_{(format\_j)} = -\sum_{i=1}^{N(format\_j)} r_i \cdot \hat{d}_i.$$

For example, a plurality of Viterbi Metric values may be calculated for a plurality of possible block formats, using, for example, one or more of a set of possible data bits represented by $N_{(format\_j)}$, as determined in block 42. The various parameters of the above format are described above.

In block 44 the process calculates a plurality of format metric values for one or more of a set of possible format parameters, for example the number of transmitted data bits as determined in block 42. These format metrics may be calculated for the Viterbi metric values calculated in block 43. This calculation may incorporate a decision level into the format metric calculation for a plurality of the possible format parameters. For example, a function may be used, such as, for example, FormatMetric$_{(format\_j)}$=DecisionLevel*$N_{(format\_j)}$−ViterbiMetric$_{(format\_j)}$ The parameters may be as defined above. The DecisionLevel may, for example, be calculated based on the amplitude value, the noise standard deviation, and/or the difference between the number of bits for the various possible formats etc. Other processes or combinations of processes may be implemented.

In block 45, the process compares the calculated format metrics for the various possible format parameters, such as the possible data bits transmitted, represented by $N_{(format\_j)}$.

In block 46, the process determines the most probable transmitted format. Typically, this format corresponds to the numerically smallest format metric, for example, as calculated in block 44, but may correspond to another metric size.

In block 47, the process uses the most probable transmitted formula to decode the transmitted block.

Other functions, operations, or combinations of operations may be implemented. Alternative embodiments may introduce into the calculations factors based, for example, on the amplitude value, the noise standard deviation, the difference between the number of bits for the respective formats or on other factors.

Figure 5:
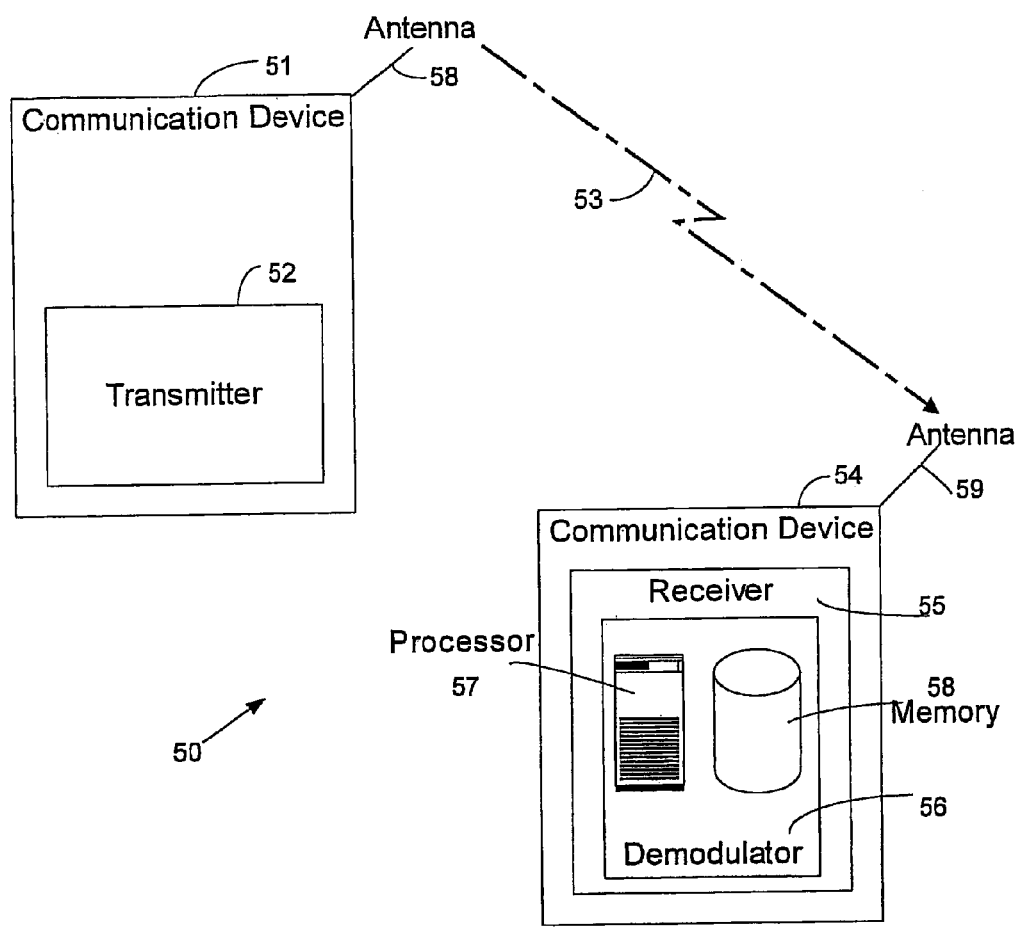
FIG. 5 is a simplified block-diagram illustration of an exemplary communication system in accordance with some embodiments of the present invention.

Reference is now made to FIG. 5, which schematically illustrates an exemplary communication system 50 in accordance with an embodiment of the present invention. Referring to FIG. 5, the communications system 50 enables a first communication device 51 to communicate with a second communication device 54 over a communication channel 53. The various embodiments of the method described above may be performed by, for example, communications device 54 and associated processing platform, although other suitable devices may perform embodiments of the method. Communications devices 51 and 54 may have antennas 58, 59, which may be, for example, dipole antennas, or other suitable antenna types.

Although the scope of the present invention is not limited in this respect, communication devices 51 and 54 may include wire or wireless or cable modems of computers and communication channel 53 may be part of a wide-area-network (WAN), local-area-network (LAN) or any other network. For example, the system may be a WLAN system or a digital subscriber line (DSL) system, or other type of network. Alternatively, although the scope of the present invention is not limited in this respect, the communication system shown in FIG. 5 may be part of a cellular communication system, with one of communication devices 51, 54 being a base station and the other a mobile station or with both communication devices 51, 54 being mobile stations, a pager communication system, a personal digital assistant (PDA) and a server, etc. In the case of a cellular wireless communication system, according to some embodiments of the invention, the communication system shown in FIG. 5 may be a 3rd Generation Partnership Project (3GPP), such as, for example, Frequency Domain Duplexing (FDD), Wideband Code Division Multiple Access (WCDMA) cellular system and the like. Devices 51 and 54 may be other types of communication devices.

Communication device 51 may include a transmitter 52, antenna 58 and any other suitable computing or communication components. Communication device 54 may include an antenna 59, and a receiver 55, which may include, for example, a demodulator 56. Demodulator 56 may include a processing platform, which, for example, may include a processor or computing unit 57 and a memory 58 coupled to processor 57. Although the scope of the present invention is not limited in this respect, processor 57 may include an application specific integrated circuit (ASIC), an application specific standard product (ASSP), a reduced instruction set circuit (RISC), a complex instruction set computer (CISC), a digital signal processor (DSP), a central processing unit (CPU), or other suitable processor. Instructions to enable computing unit 57 to perform methods of embodiments of the present invention may be stored in a memory or disk or mass storage device. Such instructions may be stored, for example, in memory 58, on a floppy disk, hard disk, flash card, or other suitable storage medium. Instructions may include computer-readable code, algorithms, definitions, and calculations etc. Any other suitable computing or communication components may be used. Execution of the instructions may be performed by processor 57, demodulator 56, or any other suitable components. The instructions may also be embodied in hardware or any suitable combination of software and/or hardware in accordance with specific implementations of embodiments of the invention.

In some embodiments, receiver 55 and transmitter 52 may be implemented, for example, using separate and/or integrated units, for example, using a transmitter-receiver or transceiver. Design considerations, such as, but not limited to, processor performance, cost and power consumption, may result in a particular processor design, and it should be understood that the design of processor 57 shown in FIG. 5 is merely an example and that embodiments of the invention are applicable to other processor designs as well.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. A method comprising:
calculating a plurality of format metric values based on a coding rate for a plurality of calculated Viterbi metric values;
comparing the calculated format metrics;
based on the comparison, determining a probable transmitted format for a transmitted block from the set of possible formats;
calculating a format metric for a possible bit value using a function:

$$FormatMetric = \frac{ViterbiMetric^2}{2\sigma^2 N} - N\ln(2)/CodingRate$$

wherein VertibiMetric$^2$ is a squared Viterbi metric value for a format parameter, N is the number of assumed transmitted bits corresponding to a format, Sigma$^2$ ($\sigma^2$) represents the noise variance of the received block, and coding rate represents the known encoding rate used for transmission for the received block; and
using a probable transmitted formula to decode the transmitted block.

2. The method of claim 1, comprising determining a plurality of possible data bit values for a transmitted data block with an unknown transmission format.

3. The method of claim 1, comprising determining the highest format metric calculated.

4. A method comprising:
calculating a plurality of Viterbi metric values for a plurality of possible format parameters;
calculating a format metric for said possible format parameters, using the respective calculated Viterbi metric values and a decision level variable;
determining a probable transmitted format for a transmitted block by comparing the calculated format metrics for the possible format parameters;
assuming a probable transmission format based on the lowest format metric calculated; and
using a probable transmitted formula to decode the transmitted block.

5. The method of claim 4, comprising basing said decision level variable on an amplitude value.

6. The method of claim 4, comprising basing said decision level variable on a noise standard deviation.

7. The method of claim 4, comprising basing said decision level variable on the difference between the number of bits for various possible formats.

8. The method of claim 4, comprising calculating a format metric for a possible bit value using a function:

$$FormatMetric=DecisionLevel*N-ViterbiMetric$$

wherein DecisionLevel is a number based on characteristics of a received packet, N is a format parameter, and ViterbiMetric is the Viterbi metric.

9. A device comprising:
a processor to calculate a plurality of Viterbi metric values for a set of possible format parameters for a received block, to calculate a set of format metrics for said possible format parameters, to compare the calculated format metric values, and, based on the comparison, to determine a probable transmitted format for a
wherein the processor is to calculate a format metric for a possible format parameter using a function:

$$FormatMetric = \frac{ViterbiMetric^2}{2\sigma^2 N} - N\ln(2)/CodingRate$$

wherein VertibiMetric$^2$ is a squared Viterbi metric value for a format parameter, N is the number of assumed transmitted bits corresponding to a format, Sigma$^2$ ($\sigma^2$) represents the noise variance of the received block, and coding rate represents the known encoding rate used for transmission for the received block;
use a probable transmitted formula to decode the transmitted block; and
a memory for storing the transmitted block.

10. The device of claim 9, wherein the processor is to determine a plurally of possible format parameter values for said received packet.

11. The device of claim 9, wherein the processor is to determine the highest format metric calculated.

12. A device comprising:
a processor to calculate a plurality of Viterbi metric values for a plurality of possible format parameters; to calculate a format metric for said possible format parameters using the calculated Viterbi metric values and a decision level variable; and to determine a probable transmitted format for a transmitted block by comparing the calculated format metrics for the possible format parameters, wherein the processor is to assume a probable transmission format based on the lowest format metric calculated and use a probable transmitted formula to decode the transmitted block; and
a memory for storing the transmitted block.

13. The device of claim 12, wherein the processor is to base said decision level variable on an amplitude value.

14. The device of claim 12, wherein the processor is to base said decision level variable on noise standard deviation.

15. The device of claim 12, wherein the processor is to base said decision level variable on die difference between the number of bits for various possible formats.

16. The device of claim 12, wherein the processor is to calculate a format metric for a possible format parameter using a function:

$$FormatMetric=DecisionLevel*N-ViterbiMetric$$

wherein DecisionLevel is a number based on characteristics of a received packet, N is a format parameter, and ViterbiMetric is the Viterbi metric.

17. A device comprising:
   a dipole antenna; and
   a processor to calculate a plurality of Viterbi metric values for a plurality of possible format parameters for a transmission format, to calculate a set of format metrics for said calculated Viterbi metrics, to compare the calculated format metrics, and, based on the comparison, to determine a probable transmitted format for a transmitted block from the set of possible formats, wherein the processor is to assume a probable transmission format based on the lowest format metric calculated and use a probable transmitted formula to decode the transmitted block; and
   a memory for storing the transmitted block.

18. The device of claim 17, wherein the processor is to determine a plurality of possible data bit values for a transmitted data block with an unknown transmission format.

19. The device of claim 17, wherein the processor is to use a probable transmitted format to decode a transmitted block of data.

20. A computer readable medium storing a computer program that when executed by a computer results in:
   the calculating of a plurality of Viterbi metric values for a plurality of possible format parameters for a transmission format;
   the calculating of a set of format metric values for said calculated Viterbi metrics;
   the comparing of the calculated format metric values;
   based on the comparison, the determining of a probable transmitted format for a transmitted block from the set of possible formats;
   assuming a probable transmission format based on the lowest format metric calculated; and
   using a probable transmitted formula to decode the transmitted block.

21. The article of claim 20, wherein the instructions, when executed by a processing platform, result in using a probable transmitted format to decode a transmitted block of data.

22. The article of claim 20, wherein the instructions, when executed by a processing platform, result in determining the highest format metric calculated.

* * * * *

UNITED STATES PATENT AND TRADEMARK OFFICE
CERTIFICATE OF CORRECTION

PATENT NO.        : 7,277,496 B2
APPLICATION NO.   : 10/608448
DATED             : October 2, 2007
INVENTOR(S)       : Lev Smolyar Page 1 of 1

It is certified that error appears in the above-identified patent and that said Letters Patent is hereby corrected as shown below:

Column 12, lines 18-19, should read: -- determine a probable transmitted format for a <u>transmitted block from the set of possible formats</u>,--

Column 12, line 38, "plurally" should be --<u>plurality</u>--

Signed and Sealed this

Twenty-sixth Day of February, 2008

JON W. DUDAS
*Director of the United States Patent and Trademark Office*